Nov. 11, 1958  A. R. JOHNSON  2,860,317
ELECTRICAL OUTLET WITH DETACHABLE FACE PLATE
Filed Feb. 19, 1957                                        2 Sheets-Sheet 1
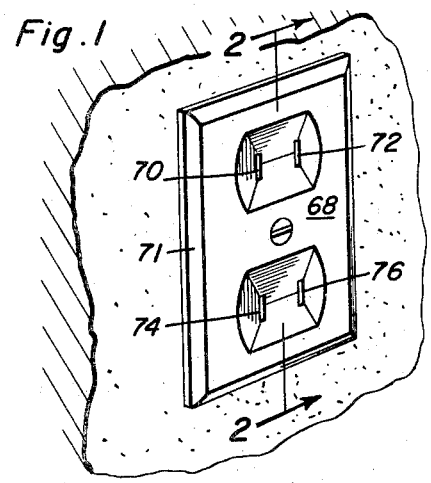
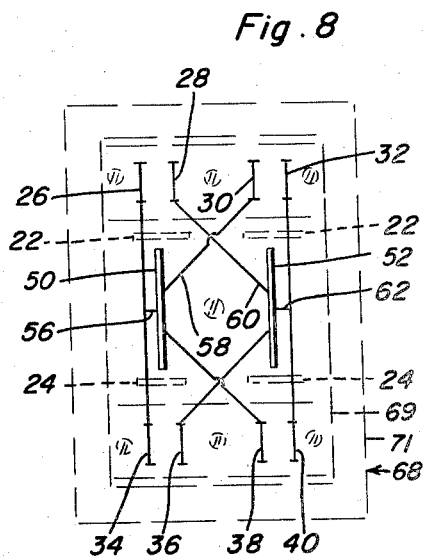
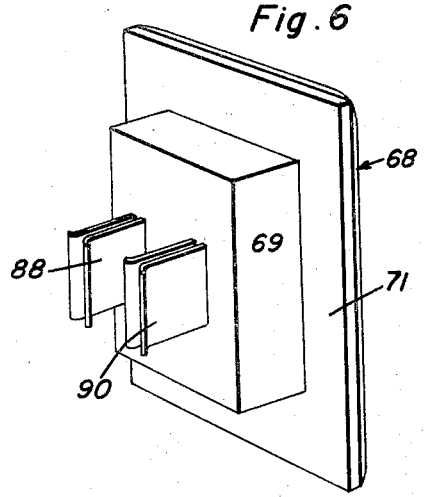
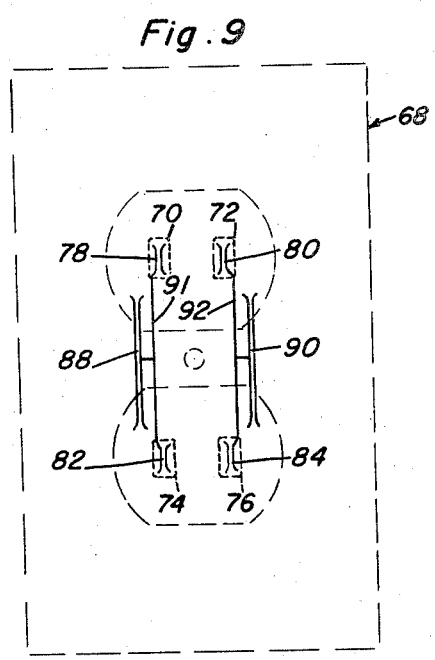
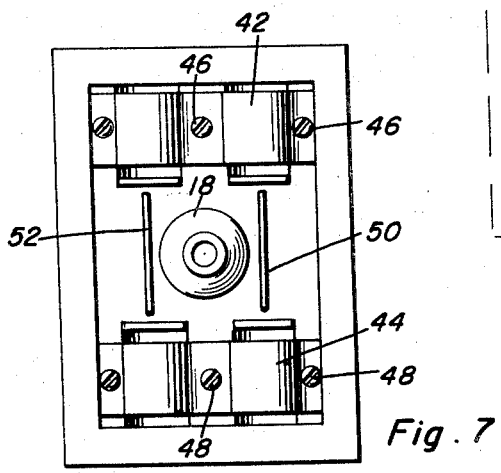
Allard R. Johnson
INVENTOR.

Nov. 11, 1958 A. R. JOHNSON 2,860,317
ELECTRICAL OUTLET WITH DETACHABLE FACE PLATE
Filed Feb. 19, 1957 2 Sheets-Sheet 2

Allard R. Johnson
INVENTOR.

BY

2,860,317

ELECTRICAL OUTLET WITH DETACHABLE FACE PLATE

Allard R. Johnson, Potlatch, Wash.

Application February 19, 1957, Serial No. 641,214

5 Claims. (Cl. 339—163)

The invention relates to a new concept in electrical terminal boxes which may assume the form of outlet boxes, switch boxes, junction boxes and the like. The invention has been illustrated herein in the form of a novel duplex convenience outlet that because of its construction will enable the saving of considerable labor in the construction and wiring of a building and which may result in a lowered material cost.

In the wiring of electrical outlets using conventional electrical outlet boxes, considerable time is usually expended in the attachment of the conductors which are embedded in suitable insulation to the terminals provided therefor. It is therefore the primary object and concept of this invention to provide means for substantially reducing the time and labor necessary to make the desired connections which includes means for securely holding a cable not having a metallic sheathing within the outlet and so arranged so as to complete an operative electrical circuit to contacts in recesses in the face plate of the outlet into which conventional plug connectors can be inserted.

Still further objects and features of this invention reside in the provision of a novel electrical outlet construction that is easy to install and attractive in appearance while being inexpensive to manufacture thereby permitting wide use and distrbution.

These, together with the various ancillary objects and features of the invention which will become apparent as the following description proceeds, are attained by this novel electrical outlet arrangement, a preferred embodiment of which has been illustrated in the accompanying drawings, by way of example only, wherein:

Figure 1 is a perspective view illustrating the appearance of the electrical outlet comprising the present invention and illustrating in particular the front of the base plate;

Figure 6 is a rear perspective view of the face plate assembly;

Figure 7 is an elevational view of the invention with the face plate removed;

Figure 8 is a wiring diagram of the insulative body and embedded electrical components; and Figure 9 is a wiring diagram of the various electrical components employed in the face plate assembly.

Figure 2:
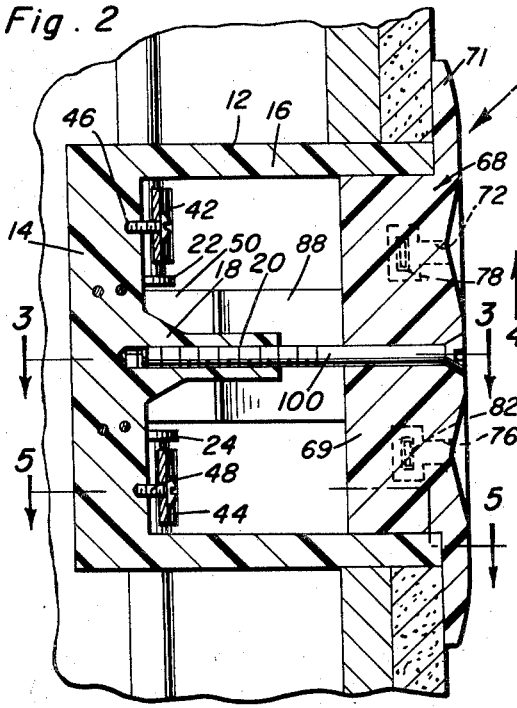
Figure 2 is an enlarged vertical sectional view as taken along the plane of line 2—2 in Figure 1.
Figure 3:
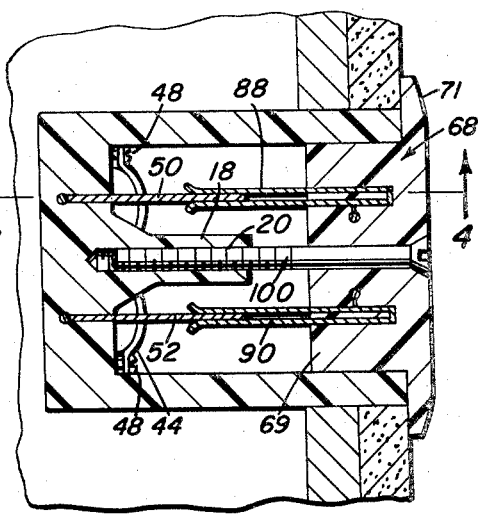
Figure 3 is a horizontal sectional view as taken along the plane of line 3—3 in Figure 2.
Figure 4:
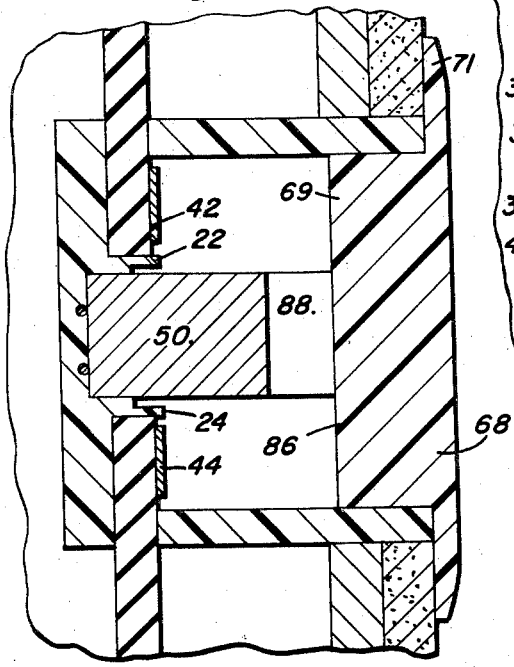
Figure 4 is a sectional detail view as taken along the plane of line 4—4 in Figure 3.
Figure 5:
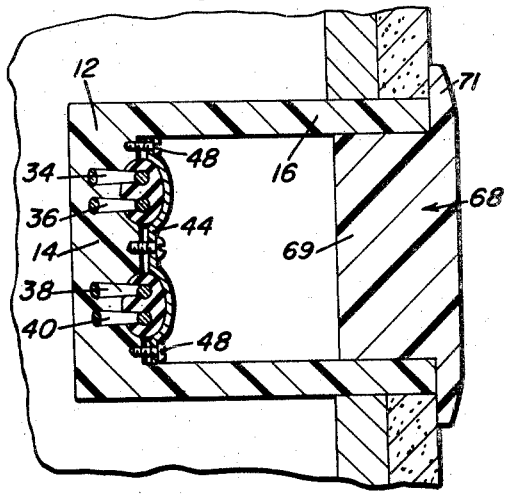
Figure 5 is a sectional detail view as taken along the plane of line 5—5 in Figure 2 illustrating in particular the construction of the saddle clamps used to hold the cable in position.

With continuing reference to the accompanying drawings wherein like reference numerals designate similar parts throughout the various views, reference numeral 10 is used to generally designate the invention. The electric outlet includes an insulative box-like body 12 formed of any suitable material of desired insulative characteristics such as Bakelite or the like and includes a rear wall 14 having integral peripheral side walls 16 presenting an open front.

The insulative body 12 is further provided with a projection 18 having an internally threaded aperture 20 and with integrally formed limit stop shoulders 22 and 24.

Embedded in the rear wall 14 of the body 12 are upper and lower pairs of stab-type pin contacts as are indicated at 26, 28; 30, 32; 34, 36; and 38, 40 in Figure 8. These stab-type pin contacts are adapted to extend outwardly of the rear wall 14 so as to penetrate the insulative material in which the conductors of dual wire cables inserted into the box through apertures in the side walls 12 and into engagement with the pairs of stop shoulders 22 and 24 extend.

Secured in alignment with the pairs of stab-type pin contacts so as to hold the cables in position on the stab-type pin contacts in penetrating relationship so that they electrically engage the conductors embedded in the cables, are a pair of saddle clamps 42 and 44. Clamping screws 46 and 48 are used to hold the saddle clamps in position and are threadedly engaged in the rear wall 16.

Embedded in the rear wall 14 and projecting outwardly therefrom are a pair of contact blades 50 and 52. Suitable conductors as are indicated at 56, 58, 60 and 62 interconnect the blades 50 and 52 with the pin contacts and these conductors are embedded in the rear wall 14.

There is provided a face plate 68 having a block portion 69 and a rectangular attachment flange 71 and having openings as at 70, 72 and 74, 76 into which respective pairs of electrical contacts 78, 80, 82 and 84 extend. Embedded in the block portion 69 of the face plate 68 are pairs of spring clips 88 and 90 which are adapted to receive the blades 50 and 52 respectively therebetween. Conductors interconnect the contacts 78 and 82 with the spring clip 88 and are indicated at 91 while spring clip 90 is interconnected with the contacts 80 and 84 by a conductor 92.

In order to hold the face plate 68 in position there is provided a screw-type fastener 100 which is threadedly engaged in the threaded recess 20. The block 86 engages the peripheral side walls 16 of the body 12. When in the position as shown in Figure 2, an operative electrical circuit from the cables to the contacts 78, 80, 82 and 84 in the recesses is provided and thus when a plug connector of conventional construction is positioned in the recesses, an operative electrical circuit to a suitable source of electrical power or other suitable connection is completed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed. For example, although the invention has been illustrated herein in connection with a duplex convenience outlet, the same is applicable to other forms of terminal boxes. The term "outlet box" as employed herein does not necessarily imply a wall type receptacle from which electric current is tapped by insertion thereinto of a male connector plug. This term is intended to include all manner of terminal boxes. Any terminal box from which electric current may flow through a lead-out wire and to which electric current may flow through a lead-in wire may be regarded as falling within the scope of the term "outlet box."

What is claimed as new is as follows:

1. An outlet box comprising an insulative body having a rear wall and peripheral side walls integral with said rear wall, stab-type pin contacts partially embedded in said rear wall, saddle clamp members adjustably secured to said rear wall in alignment with said pin contacts, blades embedded in said rear wall, conductors electrically interconnecting said blades and said pin contacts, a face plate detachably secured to said body and having spring clips receiving said blades in intimate engagement therewith.

2. An outlet box comprising an insulative body having a rear wall and peripheral side walls integral with said rear wall, stab-type pin contacts partially embedded in said rear wall, saddle clamp members adjustably secured to said rear wall in alignment with said pin contacts, blades embedded in said rear wall, conductors electrically interconnecting said blades and said pin contacts, a face plate detachably secured to said body and having spring clips receiving said blades in intimate engagement therewith, said face plate having recesses therein, contacts in said recesses, and conductors embedded in said face plate interconnecting said contacts in said recesses with said spring clips.

3. An outlet box comprising an insulative body having a rear wall and peripheral side walls integral with said rear wall, stab-type pin contacts partially embedded in said rear wall, saddle clamp members adjustably secured to said rear wall in alignment with said pin contacts, and shoulders integral with said rear wall in alignment with said pin contacts forming cable and stops, blades embedded in said rear wall, conductors electrically interconnecting said blades and said pin contacts, a face plate detachably secured to said body and having spring clips receiving said blades in intimate engagement therewith.

4. An outlet box comprising an insulative body having a rear wall and peripheral side walls integral with said rear wall, stab-type pin contacts partially embedded in said rear wall, saddle clamp members adjustably secured to said rear wall in alignment with said pin contacts, and shoulders integral with said rear wall in alignment with said pin contacts forming cable end stops, blades embedded in said rear wall, conductors electrically interconnecting said blades and said pin contacts, a face plate detachably secured to said body and having spring clips receiving said blades in intimate engagement therewith, said face plate having recesses therein, contacts in said recesses, and conductors embedded in said face plate interconnecting said contacts in said recesses with said spring clips.

5. An outlet box comprising an insulative body having a rear wall and peripheral side walls extending forwardly therefrom and defining an open rim, stab-type pin contacts carried by said rear wall, clamping devices adjustably secured to portions of the body and positioned in alignment with said pin contacts, a face plate detachably secured to said body and normally closing said open rim to thus provide a removable front wall for the body, cooperating and interengaging contacts carried by said front and rear walls respectively, projecting outwardly therefrom and designed for electrical engagement with each other when the face plate is in position on said body, said contacts being of the telescopic slidable interengaging type, and conductors electrically interconnecting said pin contacts and the contacts on said rear wall.

References Cited in the file of this patent

UNITED STATES PATENTS

| | | |
|---|---|---|
| 1,307,240 | Christopher | June 17, 1919 |
| 2,655,639 | Benander et al. | Oct. 13, 1953 |